United States Patent [19]

Vandiver

[11] Patent Number: 4,909,277
[45] Date of Patent: Mar. 20, 1990

[54] SELECTIVELY INDEXED MULTIPLE ORIFICE VALVE

[76] Inventor: Robert L. Vandiver, 9 Murifield Dr., Siloam Springs, Ark. 72761

[21] Appl. No.: 296,955

[22] Filed: Jan. 17, 1989

[51] Int. Cl.⁴ .......................... F16K 15/18; F16K 3/32
[52] U.S. Cl. .................................. 137/493.7; 251/206; 251/208; 137/382
[58] Field of Search ...................... 251/206, 207, 208; 137/382, 493.7, 493.8

[56] References Cited

U.S. PATENT DOCUMENTS

| | | | |
|---|---|---|---|
| 2,042,845 | 6/1936 | Henry | 137/382 X |
| 2,621,012 | 12/1952 | Graham | 251/207 |
| 3,677,516 | 7/1972 | Hicks | 251/208 X |
| 4,148,460 | 4/1979 | Kinsler | 251/206 |
| 4,402,340 | 9/1983 | Lockwood, Jr. | 137/493.7 |
| 4,582,084 | 4/1986 | Gyurovits | 251/206 X |

*Primary Examiner*—Arnold Rosenthal
*Attorney, Agent, or Firm*—Charles S. McGuire

[57] ABSTRACT

A flow metering device for installation in a liquid refrigerant line. A rotatable member is positioned in a flow passage between inlet and outlet ports within an enclosed chamber of the device. The member includes a portion having a plurality of orifices of different sizes having centers arranged on a circle concentrically surrounding the axis about which the member is rotatable to position a desired one of the orifices in the flow path. The enclosed chamber is accessible to permit physical rotation of the member by removal of a threaded cap normally covering an open side of the chamber. An O-ring seal prevents escape of pressurized refrigerant when the cap is removed. A check valve assembly may be included to accommodate flow of refrigerant in the opposite direction, as when used in heat pump applications where two of the devices would be employed, one with each of the indoor and outdoor coils. Only one metering device, which need not include the check valve assembly, would be used with an air conditioner, mounted at the inlet to the evaporator.

23 Claims, 1 Drawing Sheet

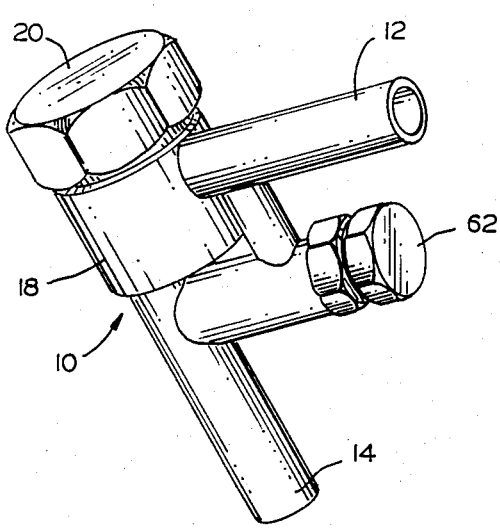
FIG. 1
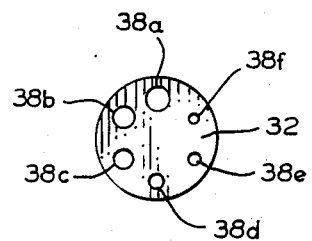
FIG. 3
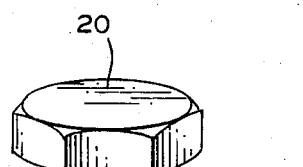
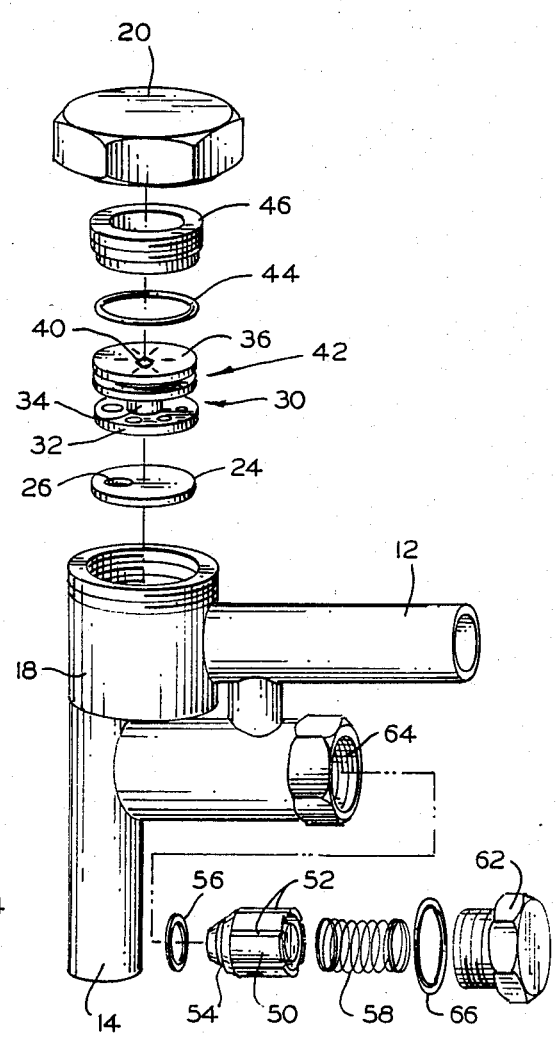
FIG. 2
FIG. 4
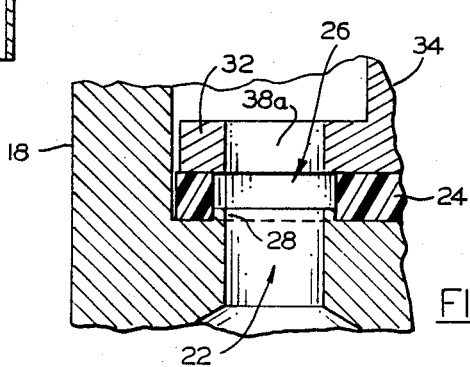
FIG. 5

SELECTIVELY INDEXED MULTIPLE ORIFICE VALVE

BACKGROUND OF THE INVENTION

The present invention relates to flow control devices for refrigerant lines and, more specifically, to a refrigerant flow control valve which may be indexed between different orifice sizes without losing the charge or taking the unit apart.

In a typical refrigeration system, e.g., an air conditioner or heat pump, a capillary tube or other flow control device is installed in the line ahead of the evaporator coil to provide a metering or expansion device for liquid refrigerant. The size of the capillary tube must be properly related to the capacity of the compressor and coil in order to provide proper balance of the system. If a different balance of compressor and coil is desired, it is normally necessary to close the system down in order to install a flow control device of different size or flow control rate. This entails losing the refrigerant charge and, after installation of the new device, recharging the system. Obviously, this is a time-consuming and expensive operation which has been avoided only by continued operation of a refrigeration system at a predetermined balance between the compressor and the evaporator coil.

It is a principal object of the present invention to provide an economically effective means for selectively varying the liquid refrigerant flow rate in a refrigeration system without losing the charge or disassembling the flow control unit.

A further object is to provide a selectively indexable flow control device which is adapted to change the size of the orifice through which liquid refrigerant flows in a simple and economical manner.

Another object is to provide a novel and improved, selectively indexed, flow control device for installation in a liquid refrigerant line.

Other objects will in part be obvious and will in part appear hereinafter.

SUMMARY OF THE INVENTION

In accordance with the foregoing objects, the invention contemplates a refrigerant flow control device including a rotatable member with a portion having a plurality of orifices of different sizes. The rotatable member is mounted in a valve body to interpose one of the orifices between an inlet and outlet. The member is accessible to permit rotation, changing the size of the operative orifice, through an opening normally closed by a removable cap. An O-ring seal prevents leakage of refrigerant past the rotatable member when the cap is removed. A low-friction disc is mounted between the rotatable member and the outlet port of the valve body.

The foregoing and other features of the invention will be more readily understood and appreciated from the following detailed description, taken in connection with the accompanying drawing.

BRIEF DESCRIPTION OF THE DRAWING FIGURES

FIG. 1 is a perspective view showing external features of the valve of the invention;

FIG. 2 is an exploded perspective view showing both internal and external parts of the valve;

FIG. 3 is a bottom plan view of one of the elements seen in FIG. 2;

FIG. 4 is an elevational view of the valve, showing all parts in their assembled condition, in vertical section through the center; and FIG. 5 is an enlarged fragment of FIG. 4.

DETAILED DESCRIPTION

Referring now to the drawing, the valve is designated generally by reference numeral 10 and includes inlet and outlet ends 12 and 14, respectively, for connection to standard tubing in a liquid refrigerant flow line ahead of the evaporator coil. Valve 10, as will become apparent, functions as a metering or expansion device, replacing the usual capillary tubes. Inlet 12 communicates through port 16 with an enclosed, cylindrically walled chamber formed by housing portion 18 and cap 20 threaded thereon. Outlet 14 communicates with the same enclosed chamber through port 22. Ports 16 and 22 are, of course, of predetermined, fixed diameter.

Flat, circular disc 24, of a low friction material such as Teflon, or the like, is placed within the enclosed chamber with opening 26 in the disc positioned in directly overlying relation with port 22. This positional relationship is maintained by lip 28, which encircles the upper end of port 22, extending a short distance into opening 26, thereby preventing rotation of disc 24, as shown in FIG. 5. The diameter of opening 26 is thus larger than that of port 22 by the added diameter of lip 28.

Also positioned within the enclosed chamber is flow control member 30, comprising lower portion 32 integrally connected by central portion 34 to upper portion 36. Lower portion 32 includes a plurality of through, circular openings or orifices 38a–38f arranged with their centers on a circle concentrically surrounding the longitudinal axis of member 30. Orifices 38a–38f are of different diameter, ranging from a largest to a smallest, respectively denoted in FIG. 3 by reference numerals 38a and 38f. Multi-sided socket 40 extends into upper portion 36 of member 30, as best seen in FIG. 4.

Groove 42 is formed in the outer periphery of upper portion 36, and O-ring 44 is positioned in groove 42. Member 30 is placed within the enclosed chamber of housing portion 18, following positioned therein of disc 24 as previously described. The chamber has a diameter slightly greater than that of lower and upper portions 32 and 36, respectively, and slightly less than that of O-ring 44. Thus, when member 30 is placed within the chamber, with the lower surface of lower portion 32 contacting the upper surface of disc 24, O-ring 44 provides an effective seal, preventing escape of pressurized liquid refrigerant from the fluid flow passage around central portion 34 past upper portion 36, even with cap 20 removed.

Externally threaded ring 46 is threaded into the upper, internally end of the enclosed chamber to engage peripheral portions of the upper surface of upper portion 36. Cap 20 is then engaged with the externally threaded portion of the upper end of the valve. A gasket (not shown) may be positioned between opposing surfaces of the cap and valve body. With the elements so assembled, liquid refrigerant passes from inlet 12, through port 16 and the orifice in lower portion 32 aligned with opening 26 and port 22, to outlet 14. For example, in FIG. 5, the largest orifice 38a, having a diameter substantially equal to that of ports 16 and 22, is in alignment with opening 26 and port 22, thus providing essentially no restriction in the flow path between the inlet and outlet ports.

Flow control member 30 may be indexed to place one of the smaller orifices 38b-38f in alignment with opening 26 and port 22 by removing cap 20, loosening ring 46 to the extent necessary, and rotating member 30 to place the desired orifice in the operative position. Indicia markings are preferably provided on the upper surface of upper portion 36, as shown in FIG. 2, to provide a visual indication of which of orifice 38a-38f is in the operative position in alignment with opening 26 and port 22. Ring 46 is again engaged with member 30 and cap 20 is replaced, whereby flow metering has been altered as desired without losing the refrigerant charge or closing the system down. Disc 24 serves as a gasket, preventing leakage of refrigerant through any of the inoperative orifices to port 22.

Although not necessary to provide flow metering in the previously described manner, the valve of the invention may conveniently include a check valve assembly, permitting flow in the opposite direction at a rate in excess of that which can be accommodated by the previously described orifice restriction. Movable valve member 50 includes a plurality of axially extending grooves 52, and peripheral groove 54 in a tapered nose portion in which resilient sealing ring 56 is positioned. Valve member 50 is biased by spring 58 to a position where in ring 56 is engaged with a stationary valve seat at the entrance to passage 60, as seen in FIG. 4.

Spring 58 is compressed between valve member 50 and plug 62 which is threaded into opening 64 in the valve body and sealed by gasket 66. The upstream side of valve member 50 communicates through passage 68 with inlet 12. Thus, when pressure on the downstream side of valve member 50, communicated through passage 60, exceeds pressure on the upstream side by an amount determined by the bias of spring 58, member 50 will be moved to break the engagement of sealing ring 56 with the valve seat. Refringerant may then flow in the reverse direction, through passage 60, grooves 52 in valve member 50, and passage 68, back to the inlet side until the pressure differential is reduced to the point that spring again moves valve member 50 to the closed position.

The check valve assembly would not be required when employing the variable orifice valve unit in conjunction with an air conditioning unit, since refrigerant flow is not reversed. However, when the cycle is reversed in a heat pump, liquid refrigerant flows in the opposite direction, and the metering orifice may present too severe a restriction to such flow. This condition arises, for example, when indoor and outdoor coils of different capacities are used, requiring different flow rates in the two directions of refrigerant flow. Two of the metering devices, each incorporating a check valve assembly, would be used in a heat pump system, one connected to each of the indoor and outdoor coils on the side thereof opposite the side connected to the reversing valve and compressor.

From the foregoing, it may be seen that the valve of the invention permits selective metering of the flow of liquid refrigerant. If a different balance of compressor and evaporator coil is desired, the valve may be indexed to a new orifice size without losing the charge or taking the unit apart, other than removing and relacing a threaded cap. Obviously, this permits very simple and rapid, selective adjustment of liquid refrigerant flow.

What is claimed is:

1. A flow control device for installation in a liquid refrigerant line ahead of the evaporator coil of a refrigeration system, said device comprising:
   (a) inlet and outlet ports extending along respective axes for flow of liquid refrigerant through said device;
   (b) means defining an enclosed chamber providing a flow passage between said inlet and outlet ports;
   (c) removable cover means providing physical access to the interior of said enclosed chamber;
   (d) a solid member having a central axis perpendicular to said inlet port axis and parallel to said outlet port axis, said member further including a plurality of apertures of different cross sectional areas, said member being positioned within said flow passage for selective movement between a plurality of positions with a different one of said apertures positioned between said inlet and outlet ports in each of said positions to permit flow of said liquid refrigerant only through the aperture so positioned; and
   (e) sealing means between said flow passage and said cover means to prevent escape of said liquid refrigerant from said flow passage when said cover means is removed to provide access to said chamber for said selective movement of said member.

2. The invention according to claim 1 wherein said solid member is rotatable about said central axis between said plurality of positions.

3. The invention according to claim 2 wherein said sealing means comprises an element mounted upon said solid member for movement therewith.

4. The invention according to claim 3 wherein said element comprises a resilient O-ring which is compressed between said solid member and said enclosed chamber to provide a substantially fluid-tight seal.

5. The invention according to claim 4 wherein said solid member includes a lower portion wherein said orifices are formed, an upper portion whereon said O-ring is mounted, and a central portion integrally joining said upper and lower portions.

6. The invention according to claim 5 wherein said orifices are circular and positioned with their centers on a circle concentrically surrounding said central axis.

7. The invention according to claim 6 wherein said inlet and outlet ports are arranged on substantially perpendicular axes.

8. The invention according to claim 7 wherein said one of said orifices is positioned in superposed relation to said outlet port.

9. The invention according to claim 5 wherein said inlet port is positioned in a cylindrical plane which extends forwardly between said upper and lower portions of said solid member.

10. A flow metering device for installation in a pressurized fluid flow line, said device comprising:
   (a) inlet and outlet ports connected by a flow passage for flow of said fluid through said device;
   (b) means defining an enclosed chamber through which said flow passage passes, said chamber having a cylindrical side wall having a central axis, and first and second end walls, said inlet and outlet ports communicating with said chamber through said side wall and said first end wall, respectively;
   (c) a solid member positioned within said chamber for selective rotational movement about said central axis, said solid member including a portion defining a plurality of discrete orifices of different cross sectional areas, any one of which may be interposed in said flow path by said rotational movement of said solid member;

(d) means for effecting said rotational movement of said solid member;

(e) at least a portion of said second end wall being movable to an open position, providing physical access to, and communication with atmospheric pressure of, an upper section of the interior of said chamber and to said means for effecting said rotational movement of said solid member; and (f) sealing means interposed between said flow passage and said upper section of said chamber, said sealing means being effective to prevent escape of said pressurized fluid from said flow passage when said second end wall portion is in said open position and said solid member is rotationally moved.

11. The invention according to claim 9 wherein said second wall portion comprises a threaded cap engageable with a portion of said means defining said enclosed chamber.

12. The invention according to claim 9 wherein said outlet port lies on an axis parallel to and spaced a predetermined distance from said central axis of said enclosed chamber, and said plurality of orifices have centers lying on a circle having a radius substantially equal to said predetermined distance.

13. The invention according to claim 12 wherein said portion of said solid member includes a planar wall superposed and parallel with said first wall of said enclosed chamber.

14. The invention according to claim 13 and further comprising a flat disc having an opening at least as large as said outlet port, said disc being interposed directly between said planar wall of said solid member and said first wall of said enclosed chamber, with said disc opening concentrically aligned with said outlet port.

15. The invention according to claim 14 and further comprising means for restraining movement of said disc relative to said first wall.

16. The invention according to claim 9 and further comprising check valve means establishing communication between said inlet and outlet ports externally of said enclosed chamber in response to a predetermined excess of pressure in said outlet port above that in said inlet port.

17. The invention according to claim 16 wherein said check valve means comprise a passageway including a valve seat, a valve member movable between open and closed positions with respect to said seat, and means biasing said valve member toward said closed position thereof.

18. The invention according to claim 17 wherein said biasing means comprises a coil spring compressed between said valve member and a fixed member to establish the value of said predetermined excess of pressure.

19. The invention according to claim 10 wherein said means for effecting rotational movement comprise a socket in a portion of said solid member accessible through said upper portion of said chamber when said second end wall portion is in said open position for engagement by a tool to rotate said solid member.

20. A flow metering device for installation in a pressurized fluid flow line with means for selectively varying the flow rate without substantial loss of pressure or interruption of flow of said pressurized fluid, said device comprising, in combination:

(a) an enclosed chamber having a cylindrical side wall, a first, substantially planar end wall, and a second end wall at least a portion of which is movable to an open position to provide physical access to a section of said chamber;

(b) an inlet portion communicating with said chamber through said side wall;

(c) an outlet port communicating with said chamber through a circular opening in said first end wall having a center spaced a predetermined distance from the central axis of said cylindrical side wall;

(d) a solid member having a cylindrical portion with a planar end surface superposed with said first end wall and rotatably mounted within said chamber coaxially with said central axis;

(e) a plurality of circular orifices extending through said cylindrical portion, said orifices being of different cross sectional areas, equal to or less than that of said circular opening, and having centers equally spaced from said central axis by said predetermined distance, whereby the rate of flow of said pressurized fluid may be selectively varied by rotating said solid member to position a different one of said orifices in registration with said circular opening;

(f) a flat disc of low friction material interposed between said planar end surface and said first end wall, said disc having a single opening at least as large as said circular opening and positioned in registration therewith; and (g) means sealing a first portion of said chamber including said first end wall and the portion of said side wall through which said inlet portion communicates with said chamber from a second portion including said second end wall.

21. The invention according to claim 20 and further including means preventing rotation of said disc as said solid member is rotated.

22. The invention according to claim 21 wherein said means for preventing rotation comprises a lip extending from said first end wall into the periphery of said single opening.

23. The invention according to claim 22 wherein said solid member and said chamber are metal and said disc is Teflon, or the like, preventing metal-to-metal contact of said planar end surface and said first end wall, thereby restricting flow of said pressurized fluid to said outlet port through only the one of said orifices in registration with said single and circular openings.

* * * * *